United States Patent Office 2,956,770
Patented Oct. 18, 1960

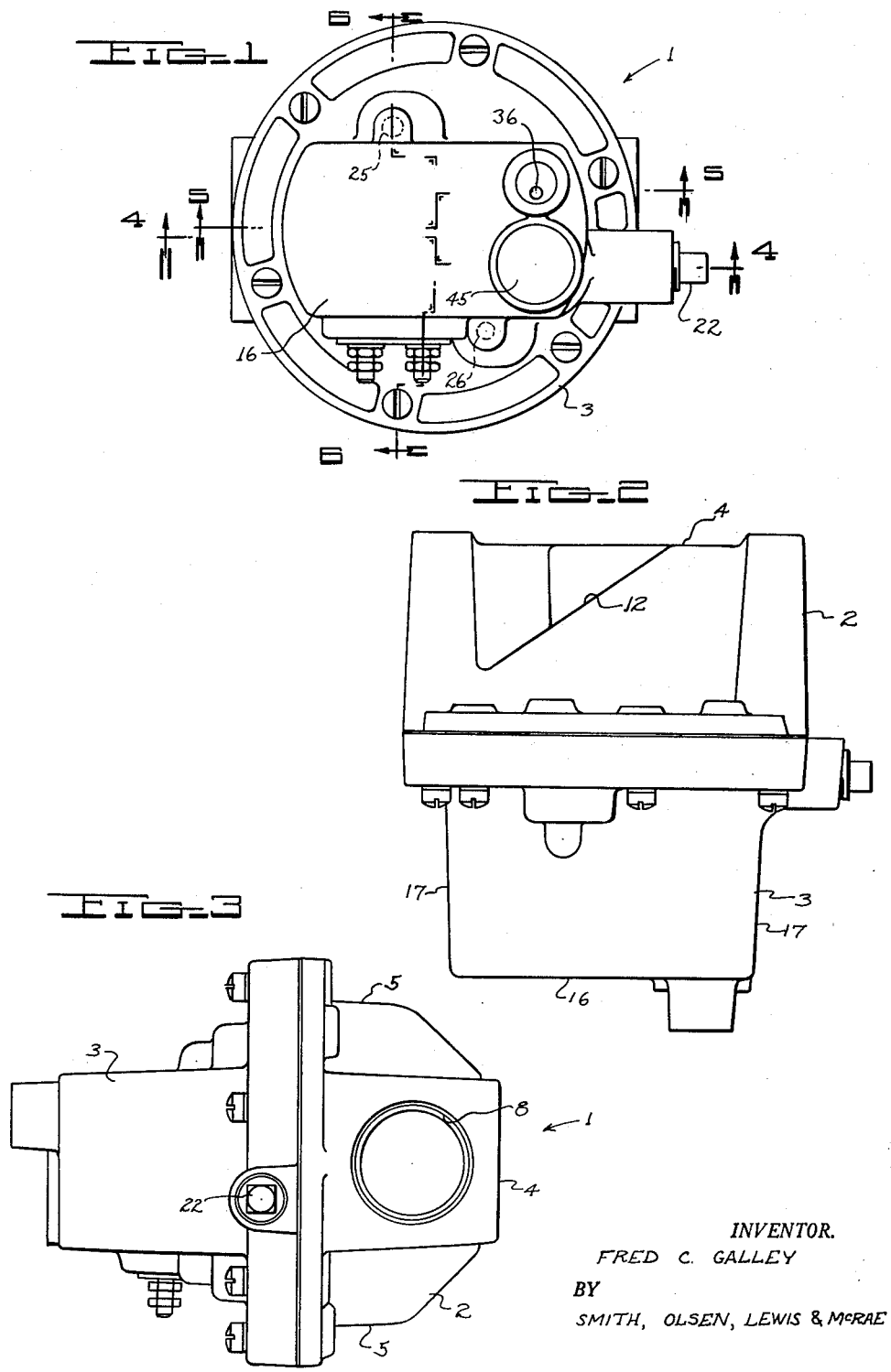

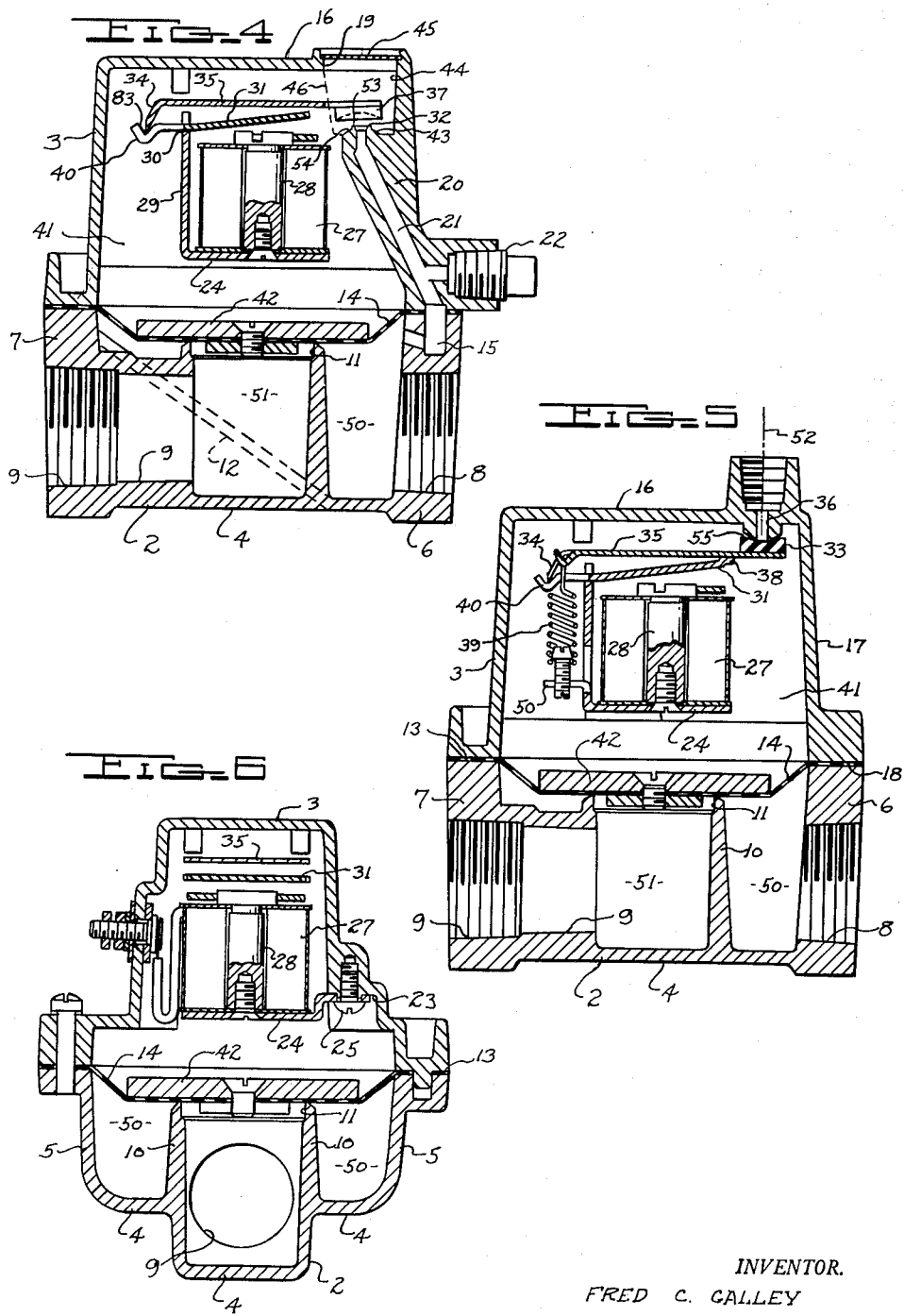

2,956,770
VALVE

Fred C. Galley, Detroit, Mich., assignor, by mesne assignments, to American Radiator & Standard Sanitary Corporation, New York, N.Y., a corporation of Delaware Filed Mar. 9, 1956, Ser. No. 570,539

2 Claims. (Cl. 251—30)

This invention relates to a fluid control valve, and is in the nature of an improvement on the valve disclosed in U.S. Patent No. 2,292,477.

Objects of the invention are to provide a fluid control valve wherein:

(1) The valve housing may be completely formed as an economical two piece construction.

(2) The valve housing members may be formed by an economical die casting process.

(3) A minimum of machining operations are required to give the valve housing members their final configurations.

(4) Pressure means is provided for insuring a tight seal between certain of the port-closing elements and the ports.

(5) The port-closing elements and port walls are designed to insure sealing contact around the ports, irrespective of any irregularities in port wall configuration due to the elimination of the conventional machining operations.

Other objects of this invention will appear in the following description and appended claims, reference being had to the accompanying drawings forming a part of this specification wherein like reference characters designate corresponding parts in the several views.

In the drawings:

Fig. 1 is a top plan view of one embodiment of the invention.

Fig. 2 is an elevational view of the Fig. 1 embodiment.

Fig. 3 is a second elevational view of the Fig. 1 embodiment.

Fig. 4 is a sectional view on line 4—4 in Fig. 1.

Fig. 5 is a sectional view on line 5—5 in Fig. 1.

Fig. 6 is a sectional view on line 6—6 in Fig. 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings there is shown a fluid control valve 1 including a lower valve housing member 2 and an upper valve housing member 3.

Member 2 includes a bottom wall 4 and a side wall 5. Diametrically aligned portions of the side wall are thickened at 6 and 7, and threaded inlet and outlet openings 8, 9 are formed in the thickened wall portions. An arcuate internal partition 10 extends from thickened wall portion 7 to form a horizontal port 11. The space between partition 10 and opening 8 forms an inlet chamber 50. The space between opening 9 and partition 10 forms an outlet chamber 51. Portions 12 of bottom wall 4 are inclined to reduce the amount of metal required to form member 2.

The upper edge of side wall 5 forms an annular upper face 13 for reception of a diaphragm 14. When diaphragm 14 is in its illustrated position outlet opening 9 is isolated from inlet opening 8 so as to prevent fluid flow through the valve. A passage 15 is extended from an inner surface of wall 5 to face 13.

It will be noted that all of the exterior surfaces of housing member 2 are in visual communication with points directly below housing member 2; i.e. if member 2 were viewed from points directly below its horizontal outline all of its exterior surfaces would be visible. With the exception of openings 8, 9 and passage 15, all of the interior surfaces of housing member 2 are in visual communication with points directly above member 2. The illustrated surface construction is advantageous in that it permits member 2 to be formed by an economical die casting operation. A male mold member (not shown) may be used to form the interior surfaces, and a female mold member (not shown) may be used to form the exterior surfaces. No destroyable sand cores are needed in the die casting operation, and member 2 may be constructed as a relatively low cost item. Openings 8, 9 and passage 15 are drilled in member 2 after the die casting operation. Besides the elimination of sand cores, the use of die casting eliminates the need for any machining in the formation of port 11, the die casting operation inherently serving to maintain relatively close surface tolerances.

Upper valve housing member 3 includes a top wall 16 and an annular side wall 17. Wall 17 forms an annular lower face portion 18 which mates with the upper face 13 of member 2 and seats against diaphragm 14. An opening 19 is formed in top wall 16, and side wall 17 is provided with a thickened portion 20 in vertical registry with opening 19. The purpose of opening 19 is to permit formation of member 3 by a die casting operation as will be explained hereinafter, and a cap 45 is provided over opening 19 after formation of member 3. A passage 21 is drilled through portion 20 in registry with passage 15. The upper limit of passage 21 defines a port 32. A clean-out plug 22 is provided for facilitating access to passage 21.

Internal surfaces 23 (only one of which is visible in the drawings) form mounting surfaces for a bracket 24. Screws 25 and 26 retain bracket 24 against surfaces 23. A power means in the form of a solenoid coil 27 is secured on bracket 24, and a core member 28 extends upwardly from bracket 24 through the center of coil 27. Bracket 24 includes an upstanding wall 29, the upper edge 30 of which forms a fulcrum for an armature 31. End portion 40 of arm 31 is turned downwardly and then upwardly to form a V-shaped notch 83 for reception of a downwardly turned end portion 34 on a superjacent arm 35. The other end of arm 35 is provided with two deformable rubber discs 33 and 37. Disc 37 opens and closes port 32. Disc 33 opens and closes a port 36 formed in top wall 16. An intermediate portion of arm 35 rests on an upturned flange 38 formed on arm 31. A tension spring 39 between arm 35 and a screw anchorage in struck out portion 50 of bracket 24 causes arm 35 to seat on arm 31 and arm 31 to seat on edge 30 of arm 29. Spring 39 has no direct contact with arm 31.

In the illustrated position solenoid coil 27 is unenergized and spring 39 is effective to maintain disc 33 closed against port 36. When coil 27 is energized aramature arm 31 is attracted downwardly to core member 28 so as to raise end portion 40 and lower flange 38. Arm 35 follows flange 38 so as to close disc 37 against port 32. Downward movement of arm 31 is greater than that required to cause disc 37 to just meet port 32. As a result disc 37 contacts port 32 while arm 31 is in an intermediate position above core member 28. Continued downward movement of arm 31 from this intermediate position causes end portion 40 to push end portion 34 of arm 35 in an upward direction. Spring 39 resists this upward push and causes disc 37 to pressuringly engage port 32. As disc 37 begins to exert pressure against port 32 the upper edge of flange 38 leaves the lower surface of arm 35.

If desired the right hand end portion of arm 35 appearing in Fig. 5 could be shortened and the right hand end portion of arm 31 lengthened to mount disc 33. The flange or projection 38 would of course be retained, and the basic operation of the port-closing mechanisms would be the same as with the illustrated construction.

During both the initial and final positions of armature arm 31 spring 39 is effective to urge one of the sealing discs (33 or 37) into pressure engagement with its respective port. As a result the tendency for leakage between each disc and its respective port is considerably reduced. The configuration of the deformable discs also reduces leakage. Each port is formed by an annular wall, with the exterior face 54 thereof being acutely tapered or angled toward the port axis 52 so as to provide a knife edge 53. The free face 55 of the registering disc is concave but the angle of the concavity with respect to the port axis is greater than that of face 54. Knife edge 53 tends to dig into the deformable disc (because of the relatively small contact area provided by the knife edge), and any irregularities in the port wall configuration are ineffective to destroy the sealing action. The difference in angularity between surfaces 54 and 55 causes the disc to wrap around the annular wall, and thereby increases the sealing wall areas.

Overall operation of the illustrated control valve is such that when solenoid coil 27 is unenergized, fluid from inlet opening 8 is directed through passages 15 and 21 into the large chamber 41 formed by housing member 3. Fluid pressure in chamber 41 is exerted downwardly against diaphragm 14 to close port 11. The inlet fluid through opening 8 of course exerts an upward pressure on diaphragm 14, but due to the presence of weight 42 and the fact that upward pressure is not exerted against the area of diaphragm 42 above port 11, the resultant pressure on the diaphragm is in a downward direction.

Energization of coil 27 closes port 32 and opens port 36. As a result none of the inlet fluid from opening 8 can pass into chamber 41, and the fluid already in chamber 41 (under pressure) is exhausted through port 36. Port 36 is in practice connected (by conduit means not shown) to an area of atmospheric or low pressure, as for example a pilot flame, one contemplated application of the illustrated valve being in the control of fuel gas to a gas burner. Exhausting of fluid from chamber 41 reduces the downward pressure on diaphragm 14 so as to raise the diaphragm and open port 11.

It will be observed that all of the exterior surfaces of housing member 3 are in visual communication with points directly above member 3. With the exception of surfaces 43 and 44 and passage 21, all of the interior surfaces of member 3 are in visual communication with points directly below member 3. Surfaces 43 and 44 are in direct vertical alignment with opening 19. By using the illustrated configuration member 3 can be formed in an economical die casting operation. The necessary female mold member includes a plug portion 46 (illustrated in dotted lines) having surfaces contoured to surfaces 43 and 44. The necessary male mold member is contoured to the shape of plug portion 46 and forms all of the interior surfaces except surfaces 43, 44, passage 21, and the opening for plug 22. Passage 21 and the opening for plug 22 are drilled through thickened wall portion 20 after formation of the housing. Cap 45 is staked in place over opening 19 after formation of member 3.

By forming member 3 in a die casting operation quantity production can be achieved at minimum cost. Sand cores are eliminated, and the inherent capacity of the die casting process to maintain close tolerances eliminates the need for machining of ports 32 and 36. The action of spring 39, together with the construction of discs 33, 37 and ports 32, 36, insures a tight sealing of ports 32 and 36, even if the port walls should be irregular due to the elimination of the conventional machining operations. In this respect the configuration of the ports and the action of spring 39 cooperate with the configuration of the valve housing members to provide an extremely low cost but reliable fluid control valve.

I claim:

1. Fluid control valve means comprising a hollow housing member of generally cup shaped configuration, said housing member including an annular side wall and an end wall connected therewith, the opposite end of said housing member being open for reception of a diaphragm member; said end wall having an opening therein; said side wall having a thickened portion in registry with the end wall opening but terminating in spaced relation thereto; a closure for said opening; a passage extending through said thickened side wall portion to define a port; a second port in said housing end wall; bracket means secured to internal surfaces of the housing member and providing a lever means support portion and a solenoid mounting portion; a solenoid mounted on said mounting portion; lever means fulcrummed on said lever support portion and extending across the solenoid into the space between the first and second ports; and spring means urging the lever means to position closing one of the ports; said solenoid being operable to move the lever means to a position closing the other port.

2. The combination of claim 1 wherein all points on the exterior surfaces of the housing member are projectable onto a common plane located on one side of the housing end wall without obstruction from other surface points; and all points on the interior surfaces of the housing member, with the exception of the passage and opening-aligned surfaces, are projectable onto a common plane located on the other side of the housing end wall without obstruction from other surface points.

References Cited in the file of this patent

UNITED STATES PATENTS

| | | |
|---|---|---|
| 1,981,259 | Wertz | Nov. 20, 1934 |
| 2,088,248 | Perry | July 27, 1937 |
| 2,092,478 | Sommermeyer | Sept. 7, 1937 |
| 2,228,588 | Ray | Jan. 14, 1941 |
| 2,329,254 | Dorman | Sept. 14, 1943 |
| 2,407,761 | McPherson | Sept. 17, 1946 |
| 2,447,510 | Langdon | Aug. 24, 1948 |
| 2,635,635 | Eimermann | Apr. 21, 1953 |
| 2,651,326 | Ray | Sept. 8, 1953 |
| 2,664,246 | Ray | Dec. 29, 1953 |
| 2,789,784 | Cobb | Apr. 23, 1957 |